(12) United States Patent
Fukumoto et al.

(10) Patent No.: US 7,283,286 B2
(45) Date of Patent: Oct. 16, 2007

(54) HOLOGRAM RECORDING/REPRODUCING DEVICE AND OPTICAL UNIT

(75) Inventors: Atsushi Fukumoto, Kanagawa (JP); Mikio Sugiki, Kanagawa (JP); Mitsuru Toishi, Tokyo (JP); Naoto Kojima, Kanagawa (JP); Hitoshi Okada, Chiba (JP); Koji Takasaki, Chiba (JP)

(73) Assignee: Sony Corporation (JP)

( * ) Notice: Subject to any disclaimer, the term of this patent is extended or adjusted under 35 U.S.C. 154(b) by 28 days.

(21) Appl. No.: 11/314,441

(22) Filed: Dec. 21, 2005

(65) Prior Publication Data

US 2006/0171006 A1 Aug. 3, 2006

(30) Foreign Application Priority Data

Dec. 27, 2004 (JP) .............................. 2004-376428

(51) Int. Cl.
G03H 1/10 (2006.01)
(52) U.S. Cl. .......................... 359/10; 359/24; 359/35; 365/125; 365/216; 369/103
(58) Field of Classification Search ................ 359/10, 359/11, 21, 24, 25, 35; 365/125, 216, 234; 369/103
See application file for complete search history.

(56) References Cited

U.S. PATENT DOCUMENTS

| | | | | |
|---|---|---|---|---|
| 6,108,110 | A * | 8/2000 | Orlov et al. ................... | 359/22 |
| 6,762,865 | B1 * | 7/2004 | Edwards ...................... | 359/29 |
| 6,775,037 | B1 * | 8/2004 | Lee ............................. | 359/35 |
| 7,184,183 | B2 * | 2/2007 | Yamatsu ...................... | 359/11 |
| 2002/0114027 | A1 * | 8/2002 | Horimai ...................... | 359/11 |
| 2003/0039001 | A1 * | 2/2003 | King et al. ................... | 359/35 |
| 2005/0174618 | A1 * | 8/2005 | Edwards ...................... | 359/11 |
| 2005/0200928 | A1 * | 9/2005 | Mori et al. ................... | 359/22 |
| 2005/0243389 | A1 * | 11/2005 | Kihara .......................... | 359/9 |
| 2006/0077853 | A1 * | 4/2006 | Matsumoto et al. ......... | 369/103 |
| 2006/0262701 | A1 * | 11/2006 | Okada et al. ................ | 369/103 |

FOREIGN PATENT DOCUMENTS

JP 11-242424 A 9/1999

* cited by examiner

*Primary Examiner*—Leonidas Boutsikaris
(74) *Attorney, Agent, or Firm*—Lerner, David, Littenberg, Krumholz & Mentlik, LLP

(57) ABSTRACT

A hologram recording/reproducing device includes a laser light source emitting laser light; a spatial light modulator generating signal light and reference light from the laser light emitted from the laser light source, the signal light and the reference light traveling in a common light path; a first relay lens system including a first shielding plate at a focal position thereof and transmitting the signal light and the reference light generated by the spatial light modulator, the first shielding plate having a pinhole whose size is 1 to 2 times a Nyquist size; a phase modulating element disposed at a conjugate plane of the signal light and the reference light transmitted through the first relay lens system; an objective lens converging the signal light and the reference light transmitted through the phase modulating element on a hologram recording medium; and a light receiving system disposed between the phase modulating element and objective lens and receiving light returning from the hologram recording medium.

8 Claims, 12 Drawing Sheets

HOLOGRAM RECORDING/REPRODUCING DEVICE AND OPTICAL UNIT

CROSS-REFERENCE TO RELATED APPLICATIONS

The present application claims priority from Japanese Patent Application Nos. JP 2004-376428 filed on Dec. 27, 2004, and JP 2005-310945 filed on Oct. 26, 2005, the disclosures of which are hereby incorporated by reference herein.

BACKGROUND OF THE INVENTION

The present invention relates to a hologram recording/reproducing device and an optical unit.

The development of a hologram recording device for recording data using holography is being pursued.

In the hologram recording device, modulated signal light (that is, signal light upon which data is superposed) and reference light which is not modulated are generated from laser light and irradiate the same location of a hologram recording medium. This results in interference between the signal light and the reference light at the hologram recording medium, causing a diffraction grating (that is, a hologram) to be formed at an irradiation point. As a result, the data is recorded on the hologram recording medium.

Irradiating with the reference light the hologram recording medium on which the data has been recorded causes diffraction light (reproduction light) to be generated from the diffraction grating formed during the recording. Since the reproduction light includes the data superposed upon the signal light during the recording, the recorded signal can be reproduced by receiving the reproduction light by a light receiving element.

In order to record a large amount of information on the hologram recording medium, a large number of holograms may be formed on the hologram recording medium. In this case, holograms are not necessarily formed on different locations of the hologram recording medium. Accordingly, what is called multiple recording for forming a plurality of holograms on the same location (that is, an area where the holograms are superposed upon each other) of the hologram recording medium may be performed.

The development of a hologram recording device whose storage capacity is increased by phase correlation multiplexing, which is one type of multiple recording, is being pursued (refer to, for example, Japanese Unexamined Patent Application Publication No. 11-242424).

In the aforementioned document, phase correlation multiplexing is achieved by using a phase mask for reference light. A phase mask may also be used for signal light to suppress a dc component of a hologram signal to be recorded.

However, when phase masks are to be used for both the signal light and the reference light, not only is it typical to use a phase mask for the signal light and a phase mask for the reference light, but also parts for these phase masks are typically used, thereby resulting in the problem that an optical system becomes sophisticated.

When these phase masks are used, noise tends to be produced. Here, when a filter for removing the noise is used, the amount of light with which the hologram recording medium is irradiated is reduced.

Accordingly, it is desirable to provide a hologram recording/reproducing device and an optical unit, whose optical system can be simplified and which can restrict generation of noise and a reduction in the amount of light even if a phase modulating element is used for both signal light and reference light.

SUMMARY OF THE INVENTION

According to an embodiment of the present invention, there is provided a hologram recording/reproducing device and an optical unit, each including a laser light source, a spatial light modulator, a first relay lens system, a phase modulating element, an objective lens, and a light receiving system. The laser light source emits laser light. The spatial light modulator generates signal light and reference light from the laser light emitted from the laser light source, the signal light and the reference light traveling in a common light path. The first relay lens system includes a first shielding plate at a focal position thereof and transmits the signal light and the reference light generated by the spatial light modulator, the first shielding plate having a pinhole whose size is 1 to 2 times a Nyquist size. The phase modulating element is disposed at a conjugate plane of the signal light and the reference light that have passed through the first relay lens system. The objective lens converges the signal light and the reference light that have passed through the phase modulating element on a hologram recording medium. The light receiving system is disposed between the phase modulating element and the objective lens and receives light returning from the hologram recording medium.

According to the embodiment of the present invention, when signal light and reference light traveling in a common light path are generated by the spatial light modulator and, for example, a phase modulating element is used for both the signal light and reference light, a structure having one phase modulating element can be achieved. This structure can simplify an optical system even if the phase modulating element is used for both the signal light and reference light.

Since the first relay lens system including the first shielding plate disposed at its focal position and having a pinhole whose size is 1 to 2 times a Nyquist size is used and the phase modulating element is disposed behind the first relay lens system and in a conjugate plane of the signal light and the reference light, even if the phase modulating element is used for both the signal light and the reference light, it is possible to restrict generation of noise and a reduction in the amount of light. If the pinhole is smaller than 1 times the Nyquist size, the amount of light is reduced, whereas if it is larger than 2 times the Nyquist size, the noise is increased.

The hologram recording/reproducing device may further include a second relay lens system including a second shielding plate at a focal position thereof and transmitting the signal light and the reference light that have passed through the phase modulating element, the second shielding plate having a pinhole whose size is 1 to 2 times the Nyquist size.

This structure makes it possible to remove noise generated at the phase modulating element. Since the size of the pinhole is 1 to 2 times the Nyquist size, it is possible to minimize the reduction in the amount of light.

In the phase modulating element, a phase pattern for the signal light and a phase pattern for the reference light may differ from each other.

By virtue of this structure, changing the phase pattern for the reference light can independently control interference between holograms, so that multiplicity can be increased.

The light receiving system may include a polarization beam splitter and a light receiving element. Here, the polarization beam splitter is disposed in a light path between the phase modulating element and the objective lens. The light receiving element receives laser light reflected by the polarization beam splitter.

Since a reflection optical system is used, an optical unit can be smaller compared to when a transmission optical system is used.

The hologram recording/reproducing device may further include a control system for controlling at a constant value the distance between the objective lens and a lens of the second relay lens system disposed near the objective lens.

As described above, according to the different forms of the present invention, when the device has one phase modulating element, even if this phase modulating element is used for both the signal light and the reference light, the optical system can be simplified. Since the first relay lens system including the first shielding plate disposed at its focal position and having a pinhole whose size is 1 to 2 times a Nyquist size is used and the phase modulating element is disposed behind the first relay lens system and in a conjugate plane of the signal light and the reference light, even if the phase modulating element is used for both the signal light and the reference light, it is possible to restrict generation of noise and a reduction in the amount of light.

DETAILED DESCRIPTION

Embodiments of the present invention will hereunder be described with reference to the drawings.

Structure of Hologram Recording/Reproducing Device

Figure 1:
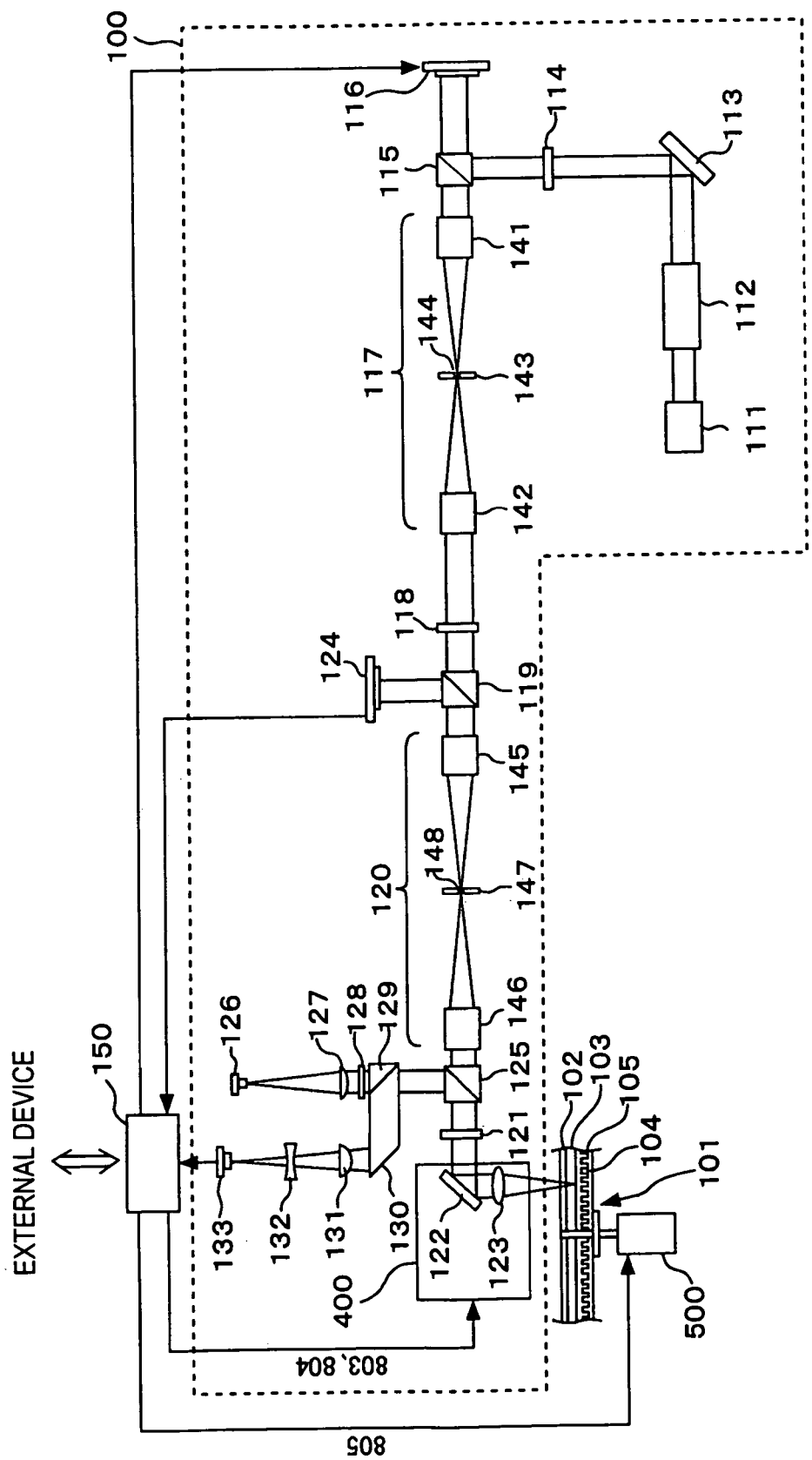
FIG. 1 is a schematic view of a hologram recording/reproducing device according to an embodiment.

FIG. 1 is a schematic view of a hologram recording/reproducing device centering on an optical unit according to an embodiment of the present invention. In the following description, unless otherwise specified, the terms "recording/reproducing device" refers to a recording device (device for performing a recording operation on a hologram recording medium), a reproducing device (device for performing a reproduction operation on the hologram recording medium), and a recording-and-reproducing device (device for performing a recording operation and a reproduction operation).

As shown in FIG. 1, the hologram recording/reproducing device records information onto and reproduces the information from a hologram recording medium 101, and includes an optical unit 100 and a controller 150.

The optical unit 100 includes a recording/reproduction light source 111, a beam expander 112, a mirror 113, a ½ wavelength plate 114, a polarization beam splitter 115, a spatial light modulator 116, a first relay lens system 117, a phase modulating element 118, a polarization beam splitter 119, a second relay lens system 120, a ¼ wavelength plate 121, a mirror 122, an objective lens 123, an image pickup element 124, a dichroic mirror 125, a servo light source 126, a collimator lens 127, a grating 128, a beam splitter 129, a mirror 130, a condensing lens 131, a cylindrical lens 132, and a light receiving element 133.

The hologram recording medium 101 has the shape of a disc in plain view. It includes a protection layer 102, a recording layer 103, a groove 104, and a reflection layer 105, and is used to record an interference fringe with signal light and reference light.

The protection layer 102 protects the recording layer 103 from the outside.

The recording layer 103 is used to record the interference fringe as a change in the refractive index (or transmittance). As long as the material for the recording layer 103 is a material whose refractive index (or transmittance) changes in accordance with the intensity of light, it may be an organic material or an inorganic material.

An example of the inorganic material is a photo-refractive material, such as lithium niobate ($LiNbO_3$), whose refractive index changes in accordance with an exposure amount by an electro-optic effect.

An example of the organic material is photopolymer. In an initial state of the photopolymer, a monomer is uniformly diffused in matrix polymer. When this is irradiated with light, the monomer is polymerized where it is exposed. As the monomer is polymerized, surrounding monomers move, causing the density of the monomers to change depending upon location.

As mentioned above, changing the refractive index (or transmittance) of the recording layer 103 in accordance with an exposure amount makes it possible for an interference fringe formed by interference between the reference light and the signal light to be recorded on the hologram recording medium as a change in the refractive index (or transmittance).

The hologram recording medium 101 may be used to record an image at the spatial light modulator 116 as a plurality of holograms by rotating the hologram recording medium 101 with a driver, such as a spindle motor 500. The optical unit 100 is moved in a radial direction of the hologram recording medium 101 with a driver (not shown).

Since the hologram recording medium 101 moves, a recording operation and a reproduction operation are performed on the hologram recording medium 101 along a track formed in the direction of movement.

The groove 104 is formed for performing servo control, such as tracking servo control or focus servo control, with respect to the hologram recording medium 101. In other words, the groove 104 is formed along the track of the hologram recording medium 101. By controlling a servo light condensing position and depth so as to correspond with the groove 104, a tracking servo operation and a focus servo operation are carried out. When the groove 104 where an address signal is modulated is formed, the address signal is read.

The recording/reproduction light source 111 is a laser light source and includes a laser diode (LD) having a wavelength of, for example, 405 nm. Laser light is converted into parallel light by, for example, a collimator lens.

The beam expander 112 is an optical element which expands the laser light emitted from the recording/reproduction light source 111 so as to have a predetermined beam diameter.

The mirror 113 is an optical element for reflecting the laser light which has passed through the beam expander 112 towards the polarization beam splitter 115.

The polarization beam splitter 115 reflects the laser light which has impinged thereupon from the mirror 113 through the ½ wavelength plate 114 towards the spatial light modulator 116, and the light reflected by the spatial light modulator 116 passes through the polarization beam splitter 115.

The spatial light modulator 116 spatially (here, two-dimensionally) modulates the signal light and superposes data upon the signal light. For the spatial light modulator 116, a Digital Micromirror Device (DMD) or a reflection liquid crystal element, which are reflection elements, or a Grating Light Valve (GLV) element may be used. In addition, for the spatial light modulator 116, a transmission liquid crystal element may also be used. In the embodiment, the spatial light modulator 116 forms the reference light so as to, for example, surround the outer periphery of the circular signal light. In other words, a reflection area (for the reference light) which only reflects the signal is provided on the spatial light modulator 116 so as to surround a circular modulation area (for the signal light). This makes it possible to generate the signal light and the reference light traveling in a common light path from the laser light emitted from the recording/reproduction light source 111.

Figure 2:
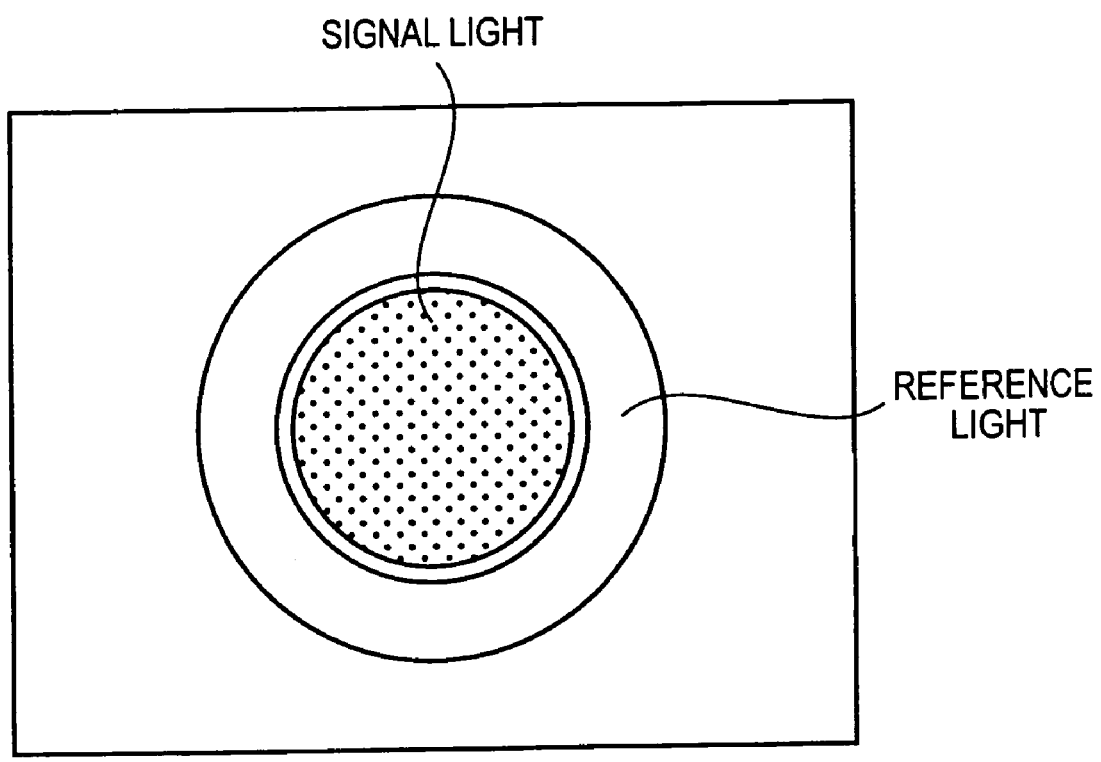
FIG. 2 shows examples of patterns of reference light and signal light which have been generated by a spatial light modulator and which have passed through a polarization beam splitter.

Patterns of the reference light and the signal light which have been generated by the spatial light modulator 116 and which have passed through the polarization beam splitter 115 are shown in FIG. 2.

The first relay lens system 117 includes a pair of lenses 141 and 142 and a shielding plate 143.

The lens 141 and the shielding plate 143 form a spatial filter for normalizing the laser light carrying the signals to a Gaussian distribution.

The lens 141 is an optical element for converging the laser light that has passed through the polarization beam splitter 115 at the shielding plate 143. The lens 141 causes the laser light that has passed through the polarization beam splitter 115 to be transformed into a Fraunhofer diffraction image (Fourier transformation image) and to be focused at a focal position of the lens 141.

The shielding plate 143 is disposed at the focal position of the lens 141 and has a pinhole 144 having a size that is 1 to 2 times a Nyquist size. 0 order light and ±1 order light passes through the pinhole 144.

The lens 142 converts the light that has passed through the pinhole 144 of the shielding light 143 into parallel light.

The phase modulating element 118 is an optical element for providing the reference light with a random phase or a certain phase pattern and may be thought of as a phase mask. For the phase modulating element 118, ground glass, a diffuser, or a spatial phase modulator may be used. In addition, a hologram element having a phase pattern recorded thereon may be used. By reproducing the phase pattern from the hologram element, light having the phase pattern is generated.

FIGS. 3A to 3D are plan views of examples of patterns at the phase modulating element 118.

Figure 3B:
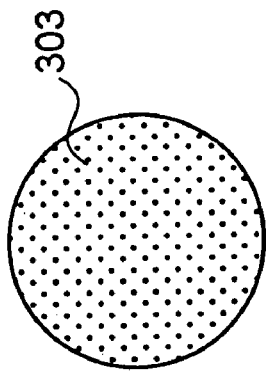
FIGS. 3A to 3D are plan views of patterns at a phase modulating element.
Figure 3D:
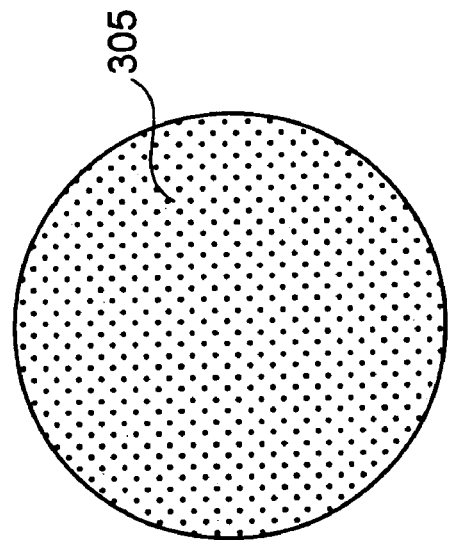
Figure 3A:
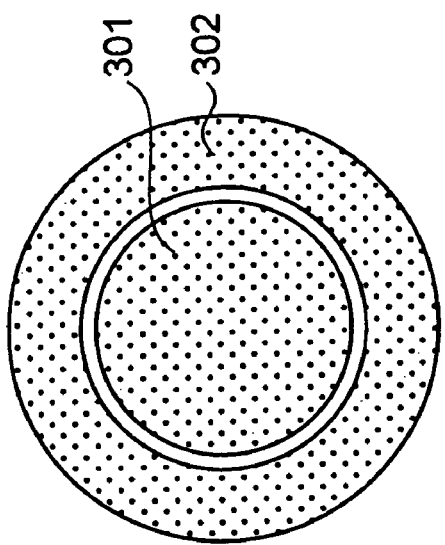

FIG. 3A shows the phase modulating element 118 having a circular signal light phase modulation area 301 and an annular reference light phase modulation area 302 disposed around the phase modulation area 301.

FIG. 3B shows the phase modulating element 118 having only a circular signal light phase modulation area 303.

Figure 3C:
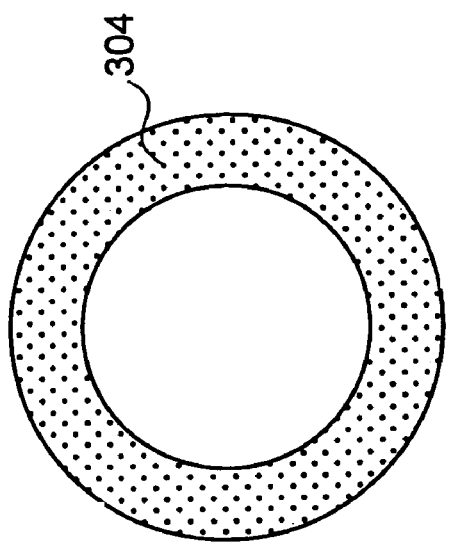

FIG. 3C shows the phase modulating element 118 having only an annular reference light phase modulation area 304.

FIG. 3D shows the phase modulating element 118 having a circular phase modulation area 305 for both signal light and reference light.

The polarization beam splitter 119 is an optical element which transmits the parallel light incident thereupon from the phase modulating element 118 and which reflects light which has been reflected by the hologram recording medium 101 and which has passed through the second relay lens system 120 towards the image pickup element 124.

The second relay lens system 120 includes a pair of lenses 145 and 146 and a shielding plate 147 having a pinhole 148. This structure is the same as the structure of the first relay lens system 117. The second relay lens system 120 can cut noise generated at the phase modulating element 118. The shielding plate 147 does not have to be particularly provided.

The objective lens 123 is an optical element for converging on the hologram recording medium 101 both the signal light and the reference light and laser light from the servo light source 126 through the ¼ wavelength plate 121 and the mirror 122 and for converting the light reflected by the hologram recording medium 101 into parallel light.

The image pickup element 124 is an element for inputting an image formed by reproduction light, and may include, for example, a two-dimensional CCD.

The dichroic mirror 125 is an optical element for forming the same light path for the light used for recording and reproduction (that is, the laser light from the recording/reproduction light source 111) and the servo light (that is, the laser light from the servo light source 126). The dichroic mirror 125 transmits the recording/reproduction light from the recording/reproduction light source 111 and reflects the servo light from the servo light source 126 due to a difference between the wavelength of the laser light from the recording/reproduction light source 111 and the wavelength of the laser light from the servo light source 126. The surface of dichroic mirror 125 has a thin film which causes the recording/reproduction light to undergo full transmission and the servo light to undergo total reflection.

The servo light source 126 is provided for performing servo control, such as tracking servo control and focus servo control, and for reading an address signal. It emits laser light having a wavelength differing from that of the laser light emitted from the recording/reproduction light source 111 and is, for example, a laser diode having an oscillation wavelength that has small sensitivity with respect to the hologram recording medium 101, such as 650 nm.

The collimator lens 127 is an optical element which converts the laser light with which it is irradiated from the servo light source 126 into parallel light.

The grating 128 is an optical element for dividing the laser light which has exited from the collimator lens 127 into three beams and includes two elemental portions. The laser light is divided to perform servo control and to read an address signal.

The beam splitter 129 is an optical element for transmitting the laser light that has exited from the grating 128 and for reflecting return light which has returned thereto by being reflected from the hologram recording medium 101.

The mirror 130 is an optical element for reflecting the return light from the beam splitter 129 towards the light receiving element 133.

Here, although the beam splitter 129 and the mirror 130 are integrated in the form of a prism, they may be formed as separate optical elements.

The condensing lens 131 is an optical element for converging the return light from the mirror 130 on the light receiving element 133.

The cylindrical lens 132 is an optical element for converting the beam shape of the laser light converged by the condensing lens 131 from circular to elliptical.

The light receiving element 133 is an element for receiving the return light and outputting a tracking error signal for tracking servo control, a focus error signal for focus servo control, and an address signal. The light receiving element 133 may be, for example, a photodiode.

Details of Actuator Unit

Figure 4:
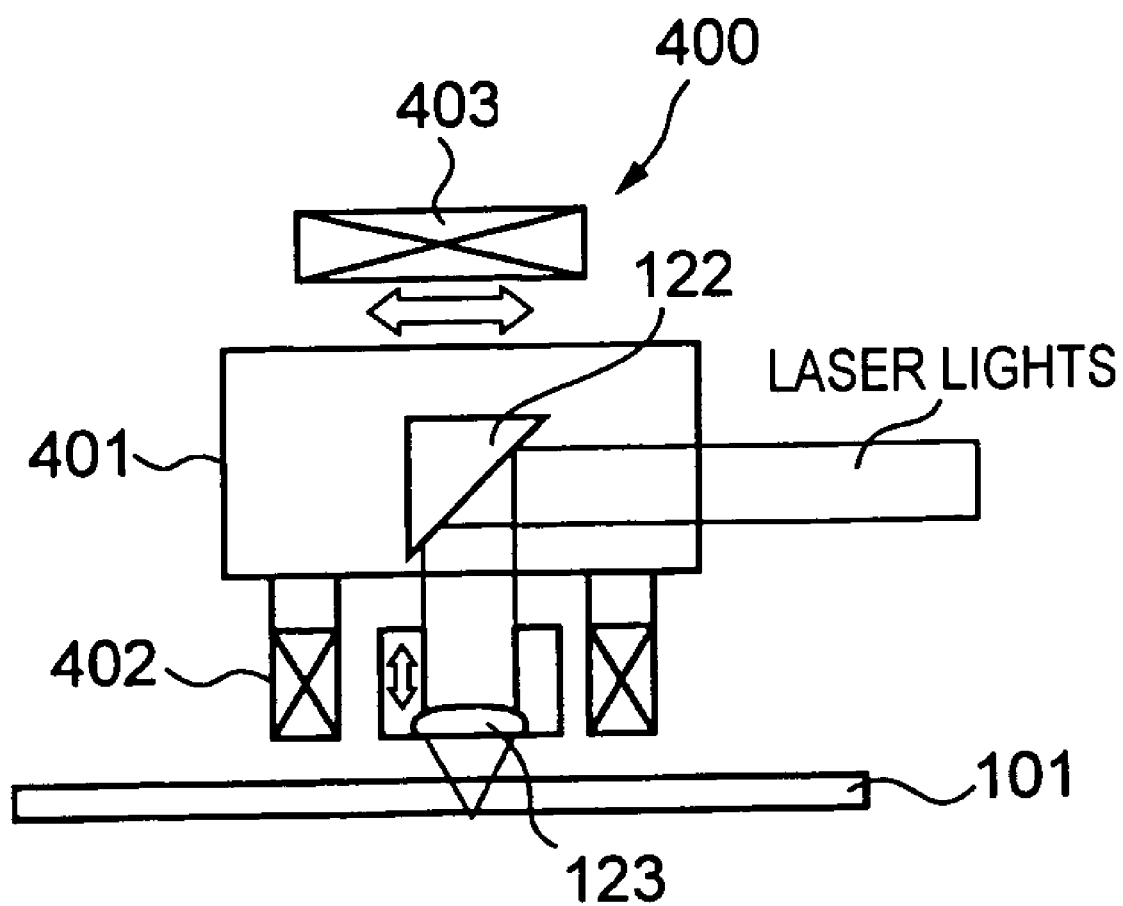
FIG. 4 is a schematic sectional view of an example of an actuator unit.

FIG. 4 is a schematic sectional view of an example of an actuator unit 400 for executing a tracking servo operation and a focus servo operation by driving the mirror 122 and the objective lens 123.

As shown in FIG. 4, the actuator unit 400 includes an actuator unit body 401, the mirror 122, the objective lens 123, a focus actuator 402, and a tracking actuator 403. The mirror 122 is mounted to the actuator unit body 401, changes the path of the laser lights (that is, the signal light, the reference light, and the laser light from the servo light source 126) whose direction of incidence is parallel to or substantially parallel to the hologram recording medium 101 into a path which allows the laser lights to be incident upon the hologram recording medium 101 perpendicularly or substantially perpendicularly to the hologram recording medium 101, and changes the path of the return lights from the hologram recording medium 101 into a path which is parallel to or substantially parallel to the hologram recording medium 101. The objective lens 123 is held by the actuator unit body 401. The focus actuator 402 drives the objective lens 123 perpendicularly to or substantially perpendicularly to the surface of the hologram recording medium 101 to carry out a focus servo operation on the objective lens 123. The tracking actuator 403 drives the actuator unit body 401 in a radial direction of the hologram recording medium 101 to carry out a tracking servo operation.

The focus actuator 402 and the tracking actuator 403 execute a focus servo operation and a tracking servo operation, respectively, on the basis of a controlling operation of the controller 150 to which the tracking error signal and the focus error signal have been input from the light receiving element 133. More specifically, a focus command voltage 803 and a tracking command voltage 804 (refer to FIG. 1) move the focus actuator 402 and the tracking actuator 403, respectively, (refer to FIGS. 8 and 10) in order to focus a light spot at a predetermined position and to control the position.

In the structure of the actuator unit 400, since, during the tracking operation, the tracking actuator 403 drives the actuator unit body 401 in a radial direction of the hologram recording medium 101, the light beams can be positioned at a predetermined position in the tracking direction. When such a tracking operation is carried out, since the laser lights are typically guided to the center of the objective lens during the positioning of the light beams, aberrations can be restricted. When hologram recording or reproduction is carried out, since a write error or a read error is very likely to occur due to such aberrations, there is significance in restricting the aberrations. The focus actuator 402 drives the objective lens 123 perpendicularly to or substantially perpendicularly to the surface of the hologram recording medium 101 in order to focus the light beams at a predetermined position in the hologram recording medium. Details of the operation of a servo system performing a focus servo operation and a tracking servo operation will be described later.

Operation of Hologram Recording/Reproducing Device

A general description of the operation of the hologram recording/reproducing device will hereunder be given.

A. During Recording

A general description of the operation of the hologram recording/reproducing device during recording will be given.

The laser light emitted from the recording/reproduction light source 111 is expanded so as to have a predetermined beam diameter by the beam expander 112. The laser light passes through the ½ wavelength plate 114 via the mirror 113, is reflected by the polarization beam splitter 115, and impinges upon the spatial light modulator 116.

The signal light and the reference light generated by the spatial light modulator 116 pass through the polarization beam splitter 115, the first relay lens system 117, the phase modulating element 118, the polarization beam splitter 119, the second relay lens system 120, the dichroic mirror 125, the ¼ wavelength plate 121, and is reflected by the mirror 122. Then, they pass through the objective lens 123, and are converged on substantially the same location of the hologram recording medium 101.

This causes an interference fringe to be formed on the hologram recording medium 101. As a result, information spatially modulated by the spatial light modulator 116 is recorded as a hologram on the hologram recording medium 101.

B. During Reproduction

A general description of the operation of the hologram recording/reproducing device during reproduction will be given.

Only the reference light impinges upon the hologram recording medium 101 during the reproduction.

The laser light emitted from the recording/reproduction light source 111 is expanded so as to have a predetermined beam diameter by the beam expander 112. The laser light passes through the ½ wavelength plate 114 via the mirror 113, is reflected by the polarization beam splitter 115, and impinges upon the spatial light modulator 116.

By setting the signal light area of the spatial light modulator 116 as being totally "dark," only the reference light passes through the polarization beam splitter 115, the first relay lens system 117, the phase modulating element 118, the polarization beam splitter 119, the second relay lens system 120, the dichroic mirror 125, the ¼ wavelength plate 121, and is reflected by the mirror 122. Then, it passes through the objective lens 123, and impinges upon the hologram recording medium 101.

When the reference light impinges upon the hologram recording medium 101, diffraction light (that is, reproduction light) is generated from the hologram recorded on the hologram recording medium 101.

The generated reproduction light travels in the light path that the incident light has passed but in the reverse direction. More specifically, the reproduction light passes through the objective lens 123, reaches the mirror 122, passes through the ¼ wavelength plate 121, the dichroic mirror 125, and the second relay lens system 120, is reflected by the polarization beam splitter 119, impinges upon the image pickup element 124, and is converted by the image pickup element 124 into an electrical signal in correspondence with spatially two-dimensional data at the spatial light modulator 116. Output from the image pickup element 124 is binarized by a signal processor (not shown), so that it is converted into time-series binarized data.

Confirmation of Advantages of Hologram Recording/Reproducing Device

The results of tests carried out to confirm the advantages of the hologram recording/reproducing device according to the embodiment will be given.

Figure 5A:
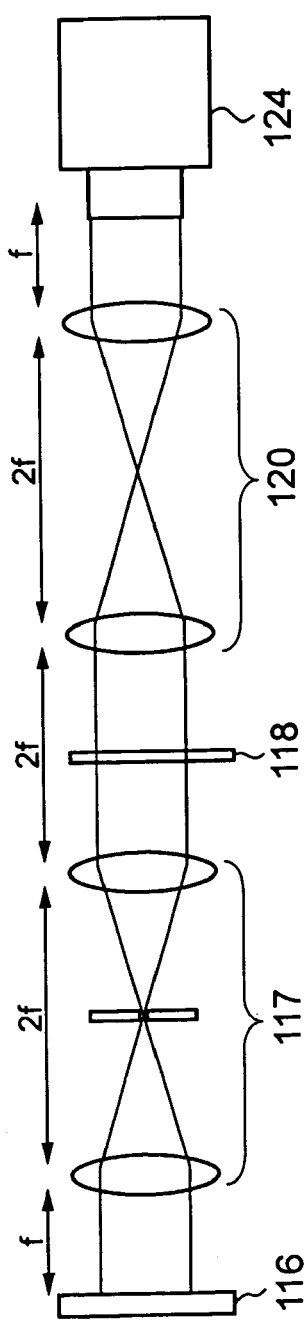
FIGS. 5A to 5C are schematic views of various optical systems on which tests were conducted to confirm the advantages of the hologram recording/reproducing device.

FIG. 5A schematically shows the relationship between the spatial light modulator 116, the phase modulating element 118, and the image pickup element 124 in the optical unit shown in FIG. 1. Here, the shielding plate 147 in the second relay lens system 120 is omitted.

Figure 5B:
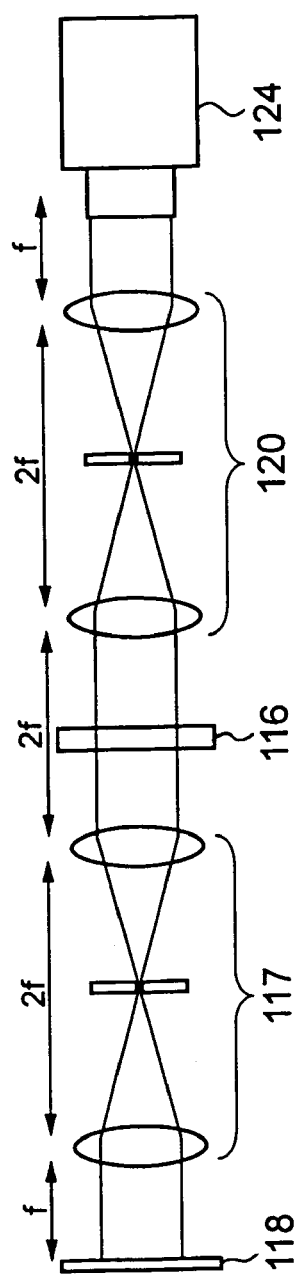
Figure 5C:
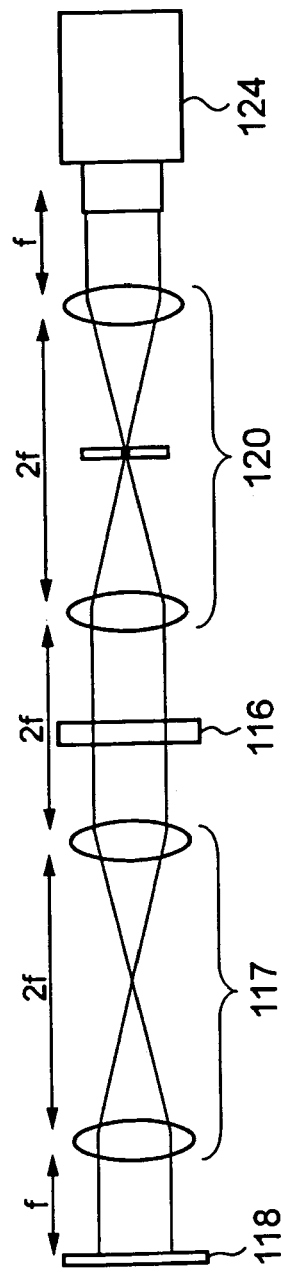

FIGS. 5B and 5C each show an example in which the phase modulating element 118 is disposed in front of the spatial light modulator 116. In FIG. 5B, shielding plates are disposed in the first and second relay lens systems, whereas, in FIG. 5C, a shielding plate is not disposed in the relay lens system between the phase modulating element 118 and the spatial light modulator 116.

Figure 6:
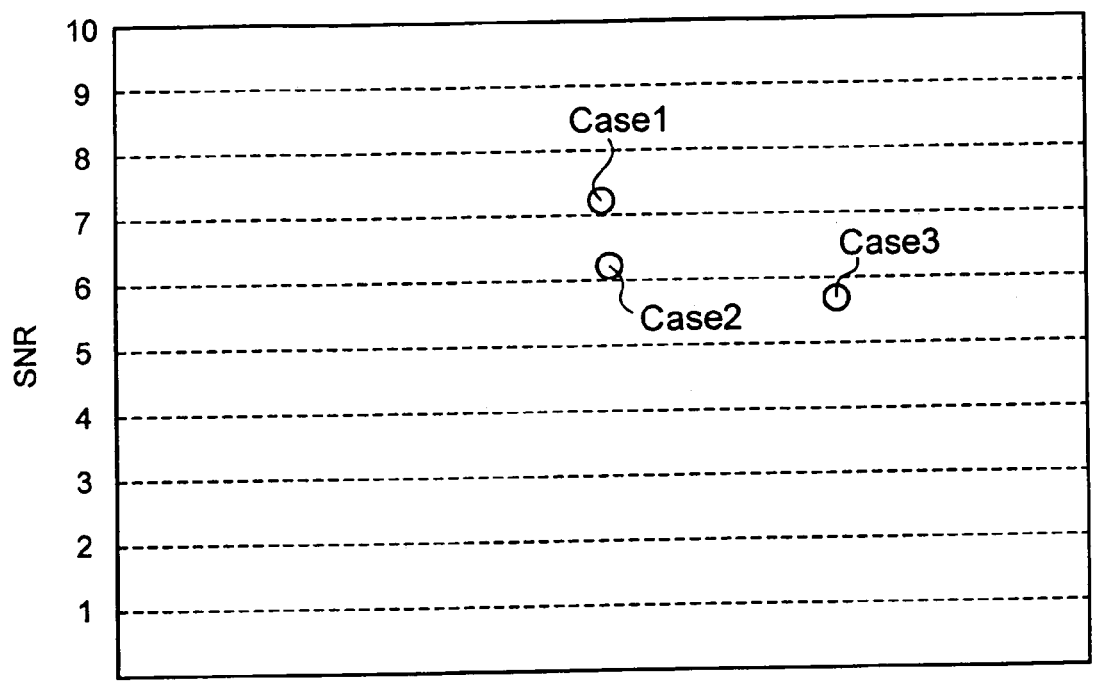
FIG. 6 is a graph showing the results of the tests that were conducted to confirm the advantages of the hologram recording/reproducing device.

FIG. 6 is a graph showing the results of measurements of SNR (signal-to-noise ratio) for these optical systems.

In FIG. 6, Case 1 indicates the result of measurement for the optical system shown in FIG. 5A, Case 2 indicates the result of measurement for the optical system shown in FIG. 5B, and Case 3 indicates the result of measurement for the optical system shown in FIG. 5C.

These results revealed the following:

(1) SNR is improved when the phase modulating element 118 is disposed behind the spatial light modulator 116 than when the phase modulating element 118 is disposed in front of the spatial light modulator 116 (Case 1 vs. Case 2 and Case 3).

(2) SNR is improved when a shielding plate is disposed in the relay lens system disposed behind the phase modulating element 118 than when a shielding plate is not disposed (Case 2 vs. Case 3).

OTHER EMBODIMENTS

In this embodiment, the distance between an objective lens 123 and a lens 146 of a second relay lens system 120 disposed near the objective lens 123 is controlled at a constant value.

As shown in FIG. 4, in the actuator unit 400, since a focus servo operation and a tracking servo operation are performed with respect to the rotating hologram recording medium 101, the position of the objective lens 123 is inevitably moved. At this time, wave aberration occurs at a hologram to be recorded/reproduced due to the movement of the objective lens 123. This embodiment makes it possible to prevent the occurrence of such wave aberration.

Figure 7:
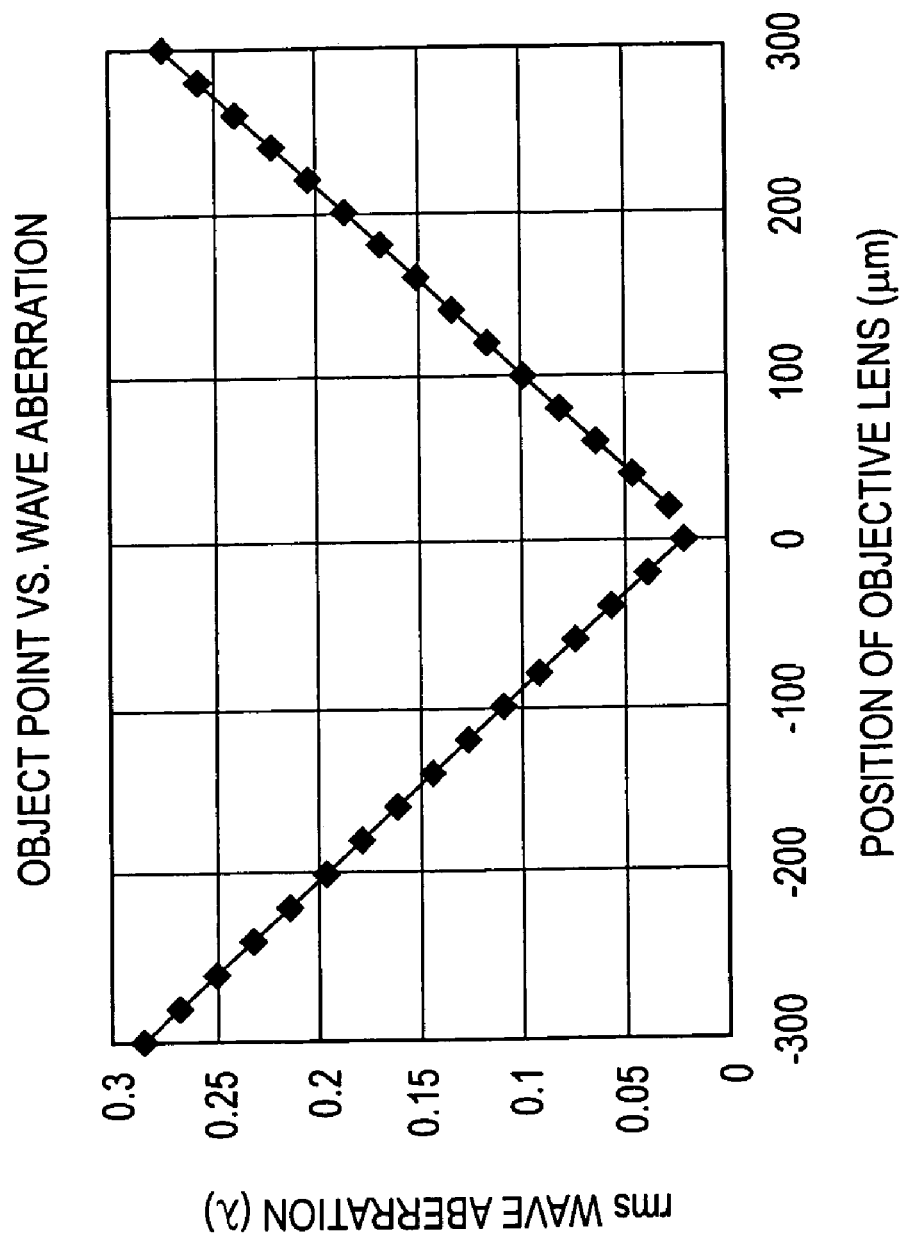
FIG. 7 is a graph of an example of wave aberration in an image at an image pickup element versus the position of an objective lens.

FIG. 7 is a graph of an example of wave aberration in an image at an image pickup element 124 versus the position of the objective lens 123.

As shown in FIG. 7, most of the wave aberration is due to defocusing (shifting from a predetermined focus). When 0.07 λ is set as a wave aberration standard which is allowable in terms of performing a recording operation/a reproducing operation, defocusing can only be carried out in a range of at most ±60 μm. Even in this range, it can be seen that the wave aberration which is sensitive to the position of the objective lens 123 increases. Actually, a tolerance of ±100 μm or more is typically set with regard to the amount by which the objective lens 123 moves in a focusing direction due to warping of the hologram recording medium 101.

To achieve this, a distance Lo1 between the objective lens 123 and the lens 146 of the second relay lens system 120 disposed near the objective lens 123 is controlled so as to be a constant value, so that an increase in wave aberration can be restricted even if the objective lens 123 moves.

Figure 8:
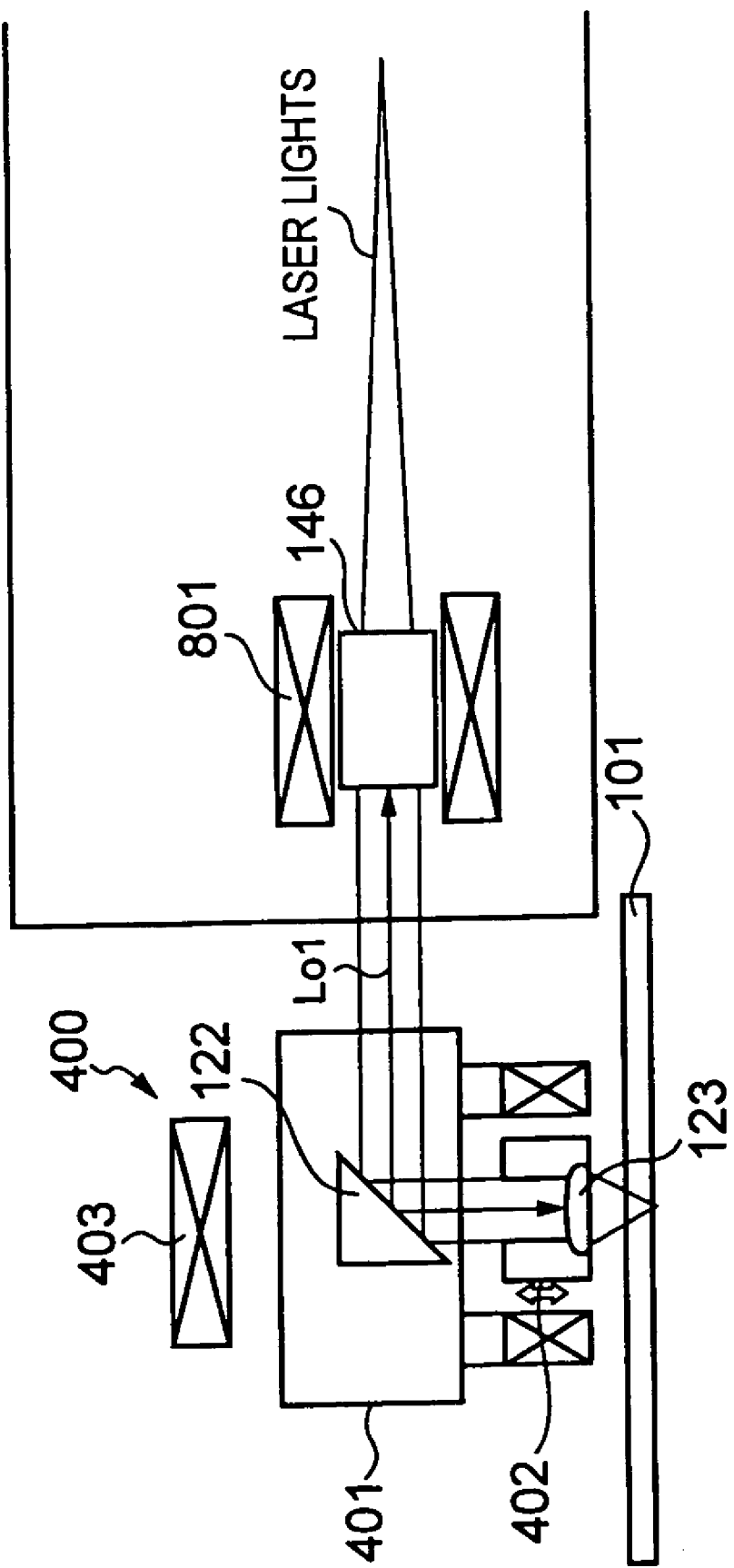
FIG. 8 is a schematic sectional view of a structure of another embodiment.

FIG. 8 is a schematic sectional view for realizing this. In FIG. 8, for the sake of simplicity, the ¼ wavelength plate 121 and the dichroic mirror 125 in FIG. 1 are not shown. Regardless of whether or not the optical parts, such as the ¼ wavelength plate 121 and the dichroic mirror 125, exist, the advantage of the embodiment is similarly provided.

Here, the distance Lo1 refers to the physical length along the optical axis.

As shown in FIG. 8, in the embodiment, the lens 146 of the second relay lens system 120 is mounted to a distance control actuator 801 for typically controlling the distance between the lens 146 and the objective lens 123 at the distance Lo1.

Figure 9:
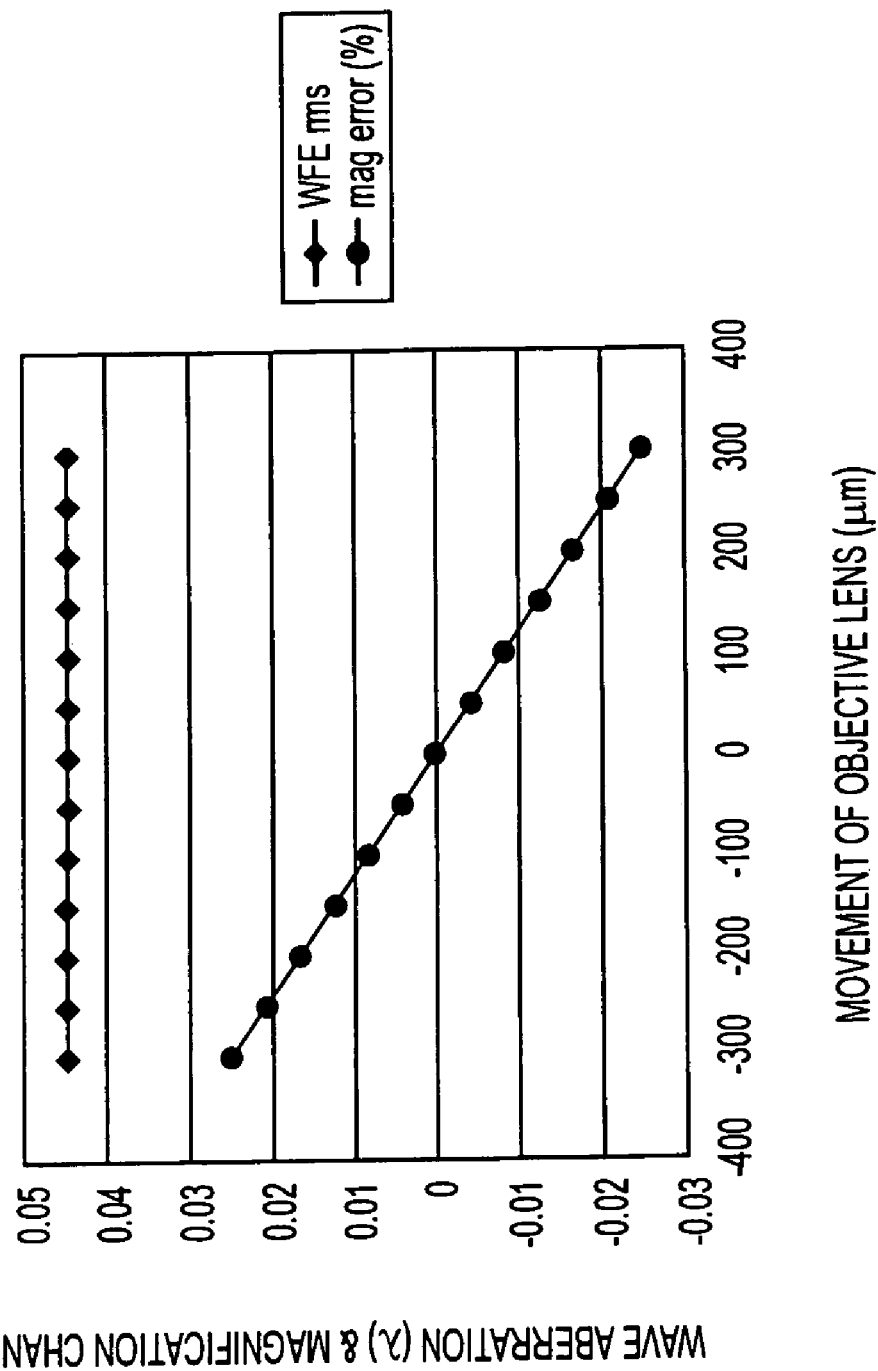
FIG. 9 is a graph of wave aberration versus the movement of an objective lens when the distance between the objective lens and a lens of a second relay lens system situated near the objective lens is controlled at a constant value.

FIG. 9 is a graph of wave aberration versus the movement of the objective lens 123 when the distance Lo1 is controlled at a constant value. From the figure, it can be understood that the wave aberration undergoes almost no change with respect to the movement of the objective lens 123 in the range of ±300 μm. Here, since only one of the relay lenses is moved, one may think that magnification change occurs. Therefore, FIG. 9 also shows image magnification change. The image magnification change is very small at 0.025% when the range is ±300 μm, so that it substantially does not influence recording/reproduction of a hologram.

Figure 10:
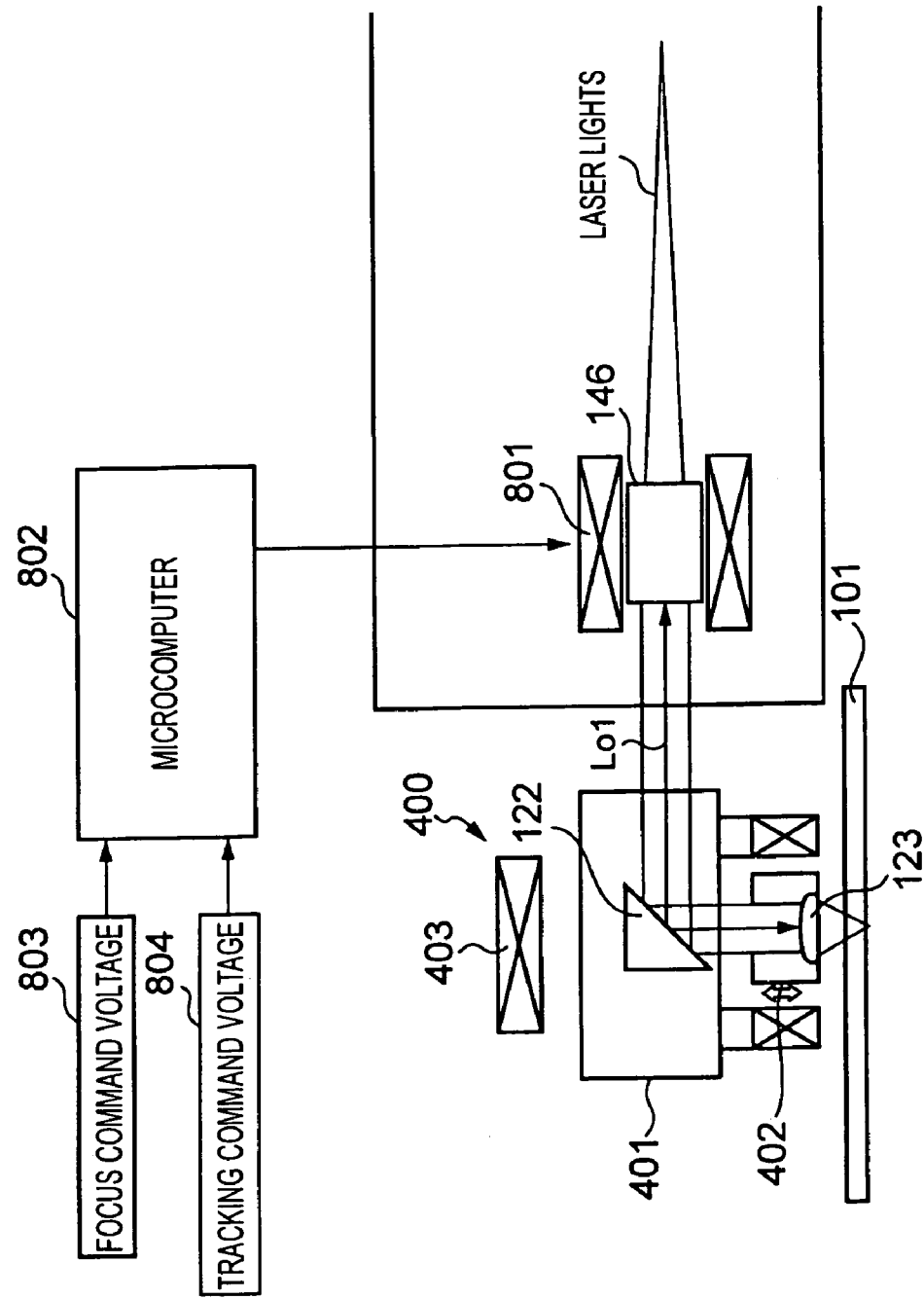
FIG. 10 shows the structure of a control system in the another embodiment.

FIG. 10 shows an example of a servo structure which controls at a constant value the distance between the objective lens 123 and the lens 146 of the second relay lens system 120 disposed near the objective lens 123.

A microcomputer 802 receives the focus command voltage 803 for the focus actuator 402 and the tracking command voltage 804 for the tracking actuator 403. The amount of movement of the objective lens 123 is calculated in the microcomputer 802.

A command voltage which moves the lens 146 of the second relay lens system 120 by an amount equivalent to the amount of movement of the objective lens 123 is determined and supplied to the distance control actuator 801. By this, in synchronism with the movement of the objective lens 123, the distance Lo1 between the lens 146 of the second relay lens system 120 and the objective lens 123 is typically controlled at a constant value. A control system for controlling the distance Lo1 will be described in detail later.

The distance control actuator 801 may use, for example, an electromagnetic coil method or a piezo method.

By the above, a hologram can be stably recorded and reproduced while carrying out a focus servo operation and a tracking servo operation.

Control Systems

In the hologram recording/reproducing device of the embodiment, since control systems are used for respective parts, the control systems will be described all together. First, with reference to FIGS. 1 and 8, the operations of a focus servo system, a tracking servo system, and a spindle servo system (feedback control systems in which a variable indicates a position) are described. Then, with reference to FIGS. 10, 11, and 12, a control system for typically setting the distance Lo1 between the objective lens 123 and the lens 146 of the relay lens system 120 at a constant value will be described in detail.

That recording/reproducing operations are carried out by specifying recording/reproduction areas on the hologram recording medium 101 is described above. Since the recording/reproduction areas are specified by the operations of the focus servo system, the tracking servo system, and the spindle servo system, these will be described in turn below.

The focus servo system, the tracking servo system, and the spindle servo system include servo optical portions for detecting servo error signals of the optical unit 100, the controller 150, the actuator unit 400 of the optical unit 100, and the spindle motor 500. The servo optical portion serving as an optical portion specifically for a servo operation uses the servo light source 126, the collimator lens 127, the grating 128, the beam splitter 129, the mirror 130, the condensing lens 131, the cylindrical lens 132, and the light receiving element 133. The servo optical portion serving as a common optical portion for the servo operation and recording/reproducing operation uses the dichroic mirror 125, the mirror 122, and the objective lens 123.

A light beam emitted from the servo light source 126 (hereafter referred to as simply the "servo beam") passes through the collimator lens 127, the grating 128, and the beam splitter 129, and reaches the dichroic mirror 125. Then, it passes through the objective lens 123 via the mirror 122, is reflected by the reflection layer 105 having the groove 104 of the hologram recording medium 101, passes again through the objective lens 123, and reaches the dichroic mirror 125 via the mirror 122. Afterwards, the servo beam is reflected by the beam splitter 129 and the mirror 130, passes through the condensing lens 131, the cylindrical lens 132, and reaches the light receiving element 133.

The light receiving element 133 is a light detector including a plurality of divided division light detector portions and generates an electrical signal which is in correspondence with the amount of light received by its corresponding division light detector portion. The main portion of the controller 150 is a calculating unit including, for example, a central processing unit (CPU) and a digital signal processor (DSP). The controller 150 receives the electrical signals and performs calculations to generate a focus error signal for a focus servo control operation by, for example, an astigmatic method and a tracking error signal for a tracking servo control operation by, for example, a push-pull method. The controller 150 detects information regarding a recorded location in the groove 104 on the basis of the signals from the light receiving element 133 or on the basis of a signal from the image pickup element 124 to generate a spindle error signal.

The controller 150 carries out calculation for, for example, phase compensation to supply the focus command voltage 803 based on the focus error signal to the focus actuator 402, so that the servo beam is focused in the form of a light spot on the reflection layer 105. In addition, the controller 150 carries out calculation for, for example, phase compensation to supply the tracking command voltage 804 based on the tracking error signal to the tracking actuator 403, so that a light spot thereof is disposed at a predetermined location in a direction perpendicular to the groove 104, and is positioned in a radial direction of the hologram recording medium 101. Further, the controller 150 carries out calculation for, for example, phase compensation to supply a spindle command voltage 805 based on the spindle error signal to the spindle motor 500, so that a light spot thereof is disposed at a predetermined location in a direction parallel with the groove 104, and is positioned perpendicularly to the radial direction.

By determining the position of the optical unit 100 and he hologram recording medium 101 relative to each other with such a servo beam, as mentioned above, the light beam from the recording/reproduction light source 111 is also disposed at a predetermined location of the hologram recording medium 101. This is because, since the servo optical portion and the recording/reproduction optical portion are integrally formed in the optical unit 100, the relationship between the light path of the servo beam from the servo light source 126 and the light path of the light beam from the recording/reproduction light source 111 is precisely defined. As a result, it is possible to write a predetermined recording data as a hologram on a predetermined area of the hologram recording medium 101 and to obtain a reproduction signal from the hologram at the predetermined area of the hologram recording medium 101.

Next, the control system for typically setting the distance Lo1 between the objective lens 123 and the lens 146 of the relay lens system 120 at a constant value will be described. As mentioned above, the microcomputer 802 receives the focus command voltage 803 and the tracking command voltage 804 by the controller 150. Then, the microcomputer 802 calculates the amount of movement of the objective lens 123, determines a command voltage which moves the lens 146 of the second relay lens system 120 by an amount equivalent to the amount of movement of the objective lens 123, and supplies the command voltage to the distance control actuator 801. By this, the distance Lo1 between the lens 146 of the second relay lens system 120 and the objective lens 123 is typically controlled at the constant value. An example of this will be described in detail with reference to FIGS. 10, 11, and 12.

The entire optical unit 100 shown in FIG. 1 is such as to be movable in an inner peripheral direction and an outer peripheral direction in accordance with a change in an area in a radial direction of the recording operation/reproducing operation in the hologram recording medium 101. However, since the optical unit 100 includes many optical parts as mentioned above, the optical unit 100 is heavy, thereby making it difficult to increase the response speed and the positioning precision in a tracking direction. Accordingly, in one form of the embodiment, the actuator unit 400 including the light mirror 122 is such as to be movable independently and in a small range in the tracking direction in the entire optical unit 100 which moves in a large range in the tracking direction, thereby increasing the response speed and the positioning precision in the tracking direction. In other words, the tracking servo system is a two-step servo system having two separated zones.

Here, when the actuator unit 400 including the mirror 122 is moved, for example, towards the left as viewed from the front of FIG. 10 by a driving force of the tracking actuator 403, the distance Lo1 becomes greater than a predetermined distance. In contrast, when the actuator unit 400 is moved towards the right as viewed from the front of FIG. 10, the distance Lo1 becomes less than the predetermined distance. As a result, in both cases, wave aberration is increased.

When the actuator unit 400 including the mirror 122 is secured and installed as a portion of the entire optical unit 100 so as not to move separately in the optical unit 100 and the entire optical unit 100 moves in an inner peripheral direction and an outer peripheral direction in accordance with a change in an area in a radial direction of the recording operation/reproducing operation in the hologram recording medium 101, the distance Lo1 is typically maintained at a constant value in a tracking direction, so that an increase in wave aberration does not occur.

The influences of a focus servo operation on the distance Lo1 will be described. When the distance between the hologram recording medium 101 and the mirror 122 changes, the focus servo operation maintains the distance between the objective lens 123 and the hologram recording medium 101 at a constant value. As a result, the distance between the mirror 122 and the objective lens 123 changes, causing the distance Lo1 to change. For example, when, in FIG. 10, the hologram recording medium 100 moves downward (as viewed from the front side of the plane of the figure) with respect to the optical unit 100, the focus servo operation causes the objective lens 123 to also move downward in the plane of the figure in accordance with the downward movement of the hologram recording medium 101, as a result of which the distance Lo1 becomes greater than a predetermined distance. In contrast, when the hologram recording medium 101 moves upward (as viewed from the front side of the plane of the figure), the focus servo operation causes the objective lens 123 to also move upward in the plane of the figure in accordance with the upward movement of the hologram recording medium 101, as a result of which the distance Lo1 becomes less than the predetermined distance. As a result, in both cases, an increase in wave aberration does not occur.

Figure 11:
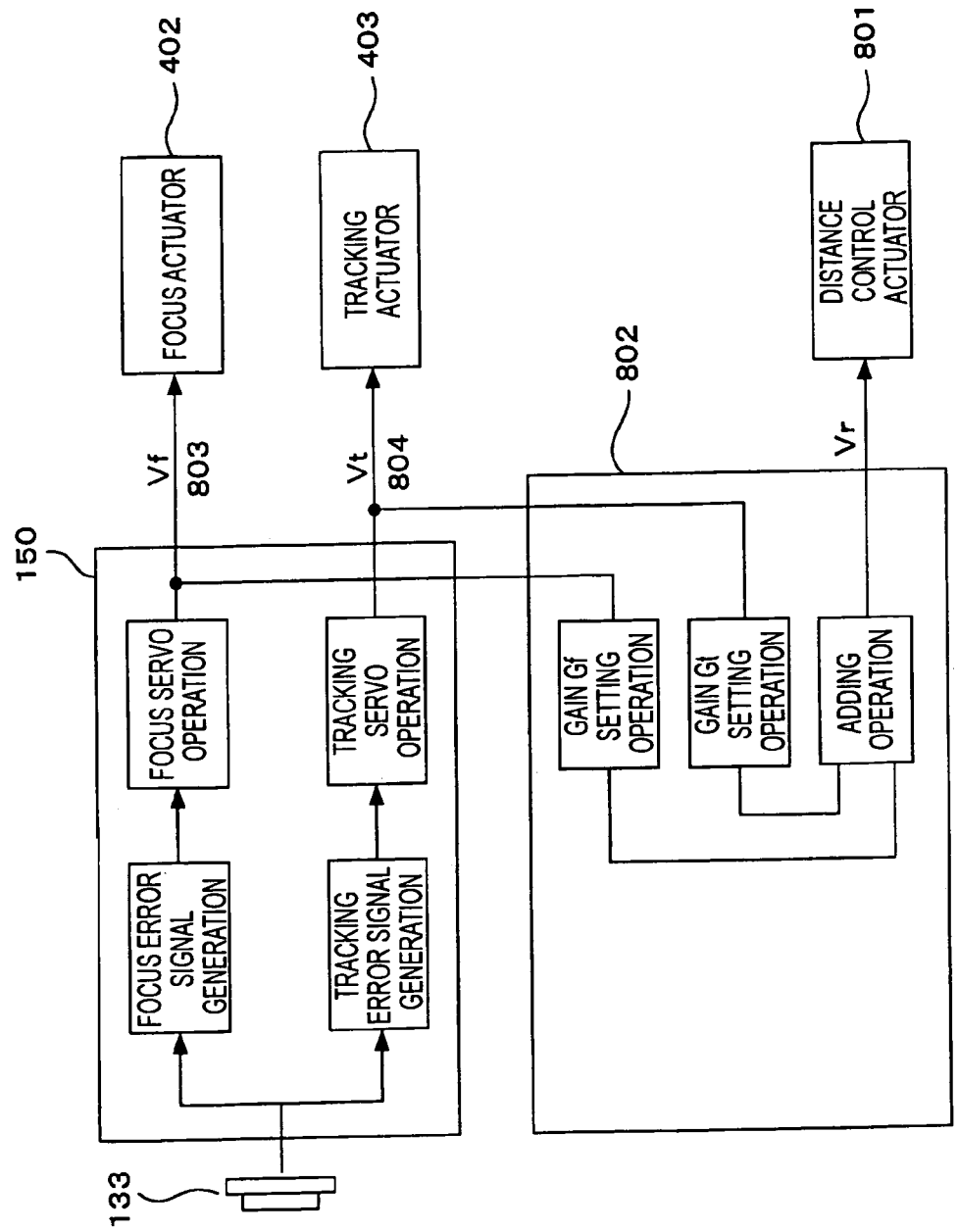
FIG. 11 is a block diagram illustrating the operations of the control system in the another embodiment.

FIG. 11 is a block diagram of the operations carried out in the microcomputer 802 and the controller 150. Here, Vf stands for the value of the focus command voltage 803, Vt stands for the value of the tracking command voltage 804, Vr stands for the value of a distance control command voltage which is supplied to the distance control actuator 801, Gf stands for gain which is multiplied by the value Vf of the focus command voltage 803, and Gt stands for gain which is multiplied by the value Vt of the tracking command voltage 804. Generation of a focus error signal corresponds to calculation based on, for example, the astigmatic method, and generation of a tracking error signal corresponds to calculation based on the push-pull method. The focus servo operation and the tracking servo operation correspond to, for example, phase compensation and gain adjustment.

The sensitivity of the focus actuator 402 is represented by Sf (μm/V), the sensitivity of the tracking actuator 403 is represented by St (μm/V), and the sensitivity of the distance control actuator 801 is represented by Sr (μm/V). Formula (1) is used to determine the voltage value Vr for maintaining the distance Lo1 at a predetermined value when the voltage value Vf is input to the focus actuator 402 having the sensitivity Sf and the voltage value Vt is input to the tracking actuator 403 having the sensitivity St.

$$Vr = (Vf \times Sf/Sr) + (Vt \times St/Sr) \quad (1)$$

In other words, the control system for typically setting the distance Lo1 at a constant value is formed as a feed-forward control system. In Formula (1), the first term represents a voltage for canceling a change in the distance Lo1 from a predetermined value when the focus actuator 402 moves, and the second term represents a voltage for canceling a change in the distance Lo1 from the predetermined value when the tracking actuator 403 moves.

In Formula (1), what is called an offset does not exist, and the distance Lo1 is a predetermined value when the voltage values Vf and Vt are zero. When an offset does exist, an offset voltage is subtracted from the voltage values Vf and Vt, and Formula (1) is then applied. When an offset similarly exists for the voltage value Vr, a voltage obtained by subtracting the offset from the calculated result of Formula (1) is applied to the distance control actuator 801, so that the distance Lo1 can be maintained at the predetermined value.

Although, in the embodiment, the microcomputer 802 is used, the controller 150 may be made to carry out the operations of the microcomputer 802, in which case the microcomputer 802 can be omitted. When the displacement of any one of or all of the focus actuator 402, the tracking actuator 403, and the distance control actuator 801 is non-linear with respect to the voltage or voltages applied to the actuator or actuators, correction values of the displacements with respect to the respective input voltages are recorded on a read only memory (ROM). By referring to the recorded correction values, the distance Lo1 can be precisely corrected.

The control system described above can set the distance Lo1 at a predetermined value when either one or both of the focus actuator and the tracking actuator move, so that a recording/reproducing device in which an increase in wave aberration does not occur can be provided.

More specifically, a form of a control system in the recording/reproducing device has the following structure. It includes the distance control actuator 801 for moving the lens 146 of the second relay lens system 120 disposed near the objective lens 123 in an optical axis direction, and controls the distance control actuator 801 so that the distance between the objective lens 123 and the lens 146 is set at a constant value, on the basis of the focus command voltage 803 which is applied to the focus actuator 402 for moving the objective lens 123 substantially perpendicularly to the surface of the hologram recording medium 101. In this case, only the first term is used for determining the voltage value Vr in Formula (1).

Another form of a control system in the recording/reproducing device has the following structure. It includes the distance control actuator 801 for moving the lens 146 of the second relay lens system 120 disposed near the objective lens 123 in an optical axis direction, and controls the distance control actuator 801 so that the distance between the objective lens 123 and the lens 146 is set at a constant value, on the basis of the focus command voltage 803 which is applied to the focus actuator 402 for moving the objective lens 123 substantially perpendicularly to the surface of the hologram recording medium 101 and the tracking command voltage 804 which is applied to the tracking actuator 403 for moving the objective lens 123 substantially horizontally to the surface of the hologram recording medium 101. In this case, the first and second terms are used to determine the voltage value Vr in Formula (1). In addition, when the tracking servo system is what is called a one-step servo system in which only the actuator unit 400 in the optical unit 100 changes its position with respect to the spindle motor 500, instead of being a two-step servo system, the first and second terms are also used for determining the voltage value Vr in Formula (1).

Figure 12:
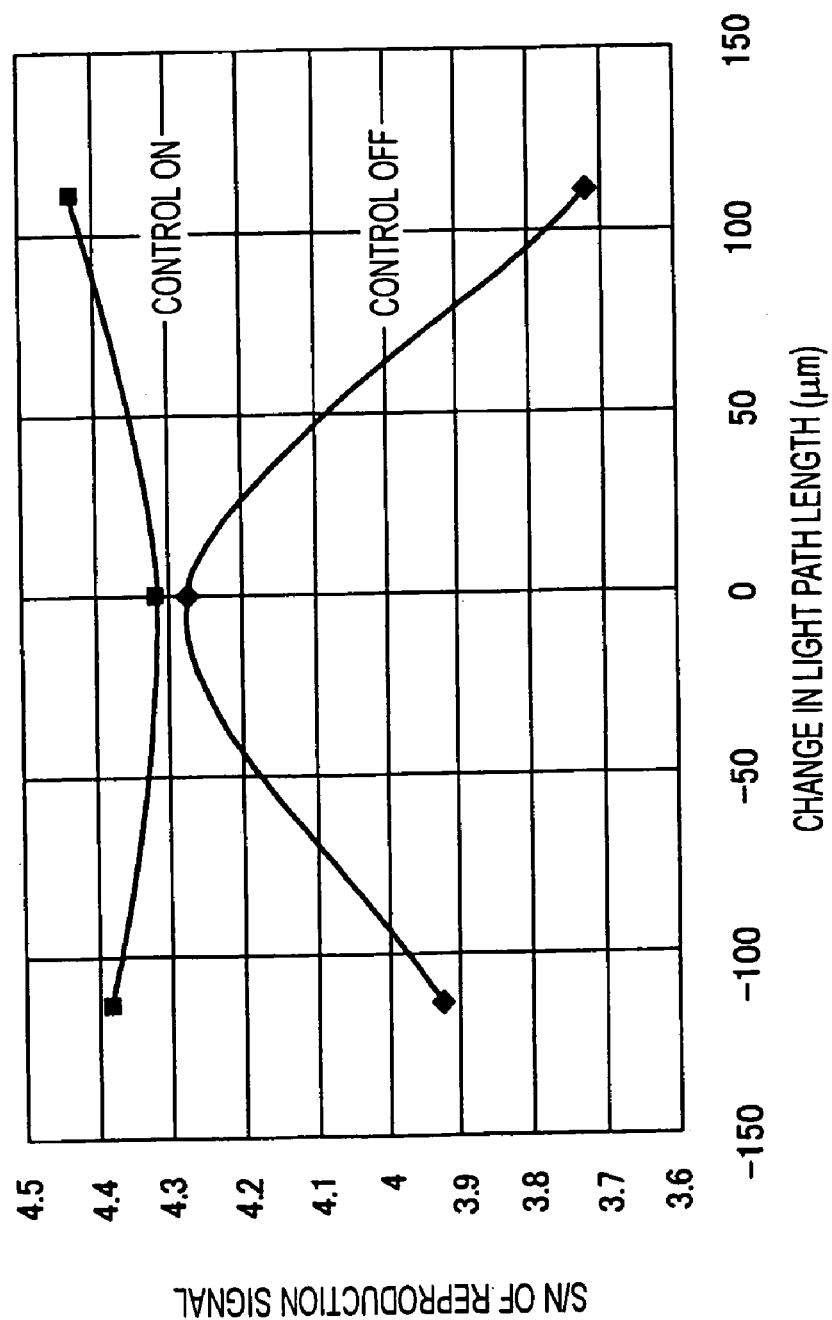
FIG. 12 is a graph showing experimental results illustrating advantages of the control system in the another embodiment.

FIG. 12 is a graph showing the results of experiments carried out on the basis of Formula (1). The horizontal axis represents the amount of change in a light path length (distance Lo1), and the movements of both the mirror 122 and the objective lens 123 are included in the amount of change in the light path length. The vertical axis represents S/N (signal-to-noise ratio) of a reproduction signal. A "control ON" curve indicates a characteristic for the case in which the aforementioned controlling operation for maintaining the distance Lo1 at a constant value is carried out, and a "control OFF" curve indicates a characteristic for the case in which the aforementioned controlling operation for maintaining the distance Lo1 at a constant value is not carried out, with the influences of wave aberration being reflected in the S/N of the reproduction signal. In other words, when the controlling operation is carried out ("control ON"), the S/N of the reproduction signal is increased.

Other Operations Carried Out by the Controller

The controller 150, which carries out some of the operations of the control systems, also controls other parts of the recording/reproducing device. The controller 150 controls the optical unit 100 during a recording operation or a reproducing operation. More specifically, in a writing operation, a two-dimensional pattern, which is based on information (recording data), is displayed on a signal-light display area and a reference-light display area of the spatial light modulator 116 by a signal from the controller 150 in accordance with the information (recording data). In a reproducing operation, a two-dimensional pattern is written onto the reference-light display area of the spatial light modulator 116, and an output from the array light detector 133 is processed by the controller 150. In a recording operation, information to be recorded is received from an external device, whereas, in a reproducing operation, reproduction information processed by the controller is output to the external device.

The present invention is not limited to the above-described embodiments, so that various modifications may be made within the scope of the technical ideas of the present invention. For example, although the hologram recording medium is described as being a disc-shaped recording medium, the hologram recording medium may be other types of recording media such as a card recording medium.

The invention claimed is:

1. A hologram recording/reproducing device, comprising:
a laser light source emitting laser light;
a spatial light modulator generating signal light and reference light from the laser light emitted from the laser light source, the signal light and the reference light traveling in a common light path;
a first relay lens system including a first shielding plate at a focal position thereof and transmitting the signal light and the reference light generated by the spatial light modulator, the first shielding plate having a pinhole whose size is 1 to 2 times a Nyquist size;
a phase modulating element disposed at a conjugate plane of the signal light and the reference light that have passed through the first relay lens system;
an objective lens converging the signal light and the reference light that have passed through the phase modulating element on a hologram recording medium; and
a light receiving system disposed between the phase modulating element and the objective lens for receiving light returning from the hologram recording medium.

2. The hologram recording/reproducing device according to claim 1, further comprising a second relay lens system including a second shielding plate at a focal position thereof and transmitting the signal light and the reference light that have passed through the phase modulating element, the second shielding plate having a pinhole whose size is 1 to 2 times the Nyquist size.

3. The hologram recording/reproducing device according to claim 1, wherein a phase pattern for the signal light and a phase pattern for the reference light differ from each other in the phase modulating element.

4. The hologram recording/reproducing device according to claim 1, wherein the light receiving system includes a polarization beam splitter and a light receiving element, the polarization beam splitter being disposed in a light path between the phase modulating element and the objective lens, the light receiving element receiving laser light reflected by the polarization beam splitter.

5. The hologram recording/reproducing device according to claim 2, further comprising means for controlling at a constant value the distance between the objective lens and a lens of the second relay lens system disposed near the objective lens.

6. The hologram recording/reproducing device according to claim 2, further comprising a distance control actuator for moving a lens of the second relay lens system disposed near the objective lens in an optical axis direction, wherein the distance control actuator is controlled so that the distance between the objective lens and the lens of the second relay lens system is set at a constant value based on a focus command voltage which is applied to a focus actuator for moving the objective lens substantially perpendicularly to a surface of the hologram recording medium.

7. The hologram recording/reproducing device according to claim 2, further comprising a distance control actuator for moving a lens of the second relay lens system disposed near the objective lens in an optical axis direction, wherein the distance control actuator is controlled so that the distance between the objective lens and the lens of the second relay lens system is set at a constant value based on a focus command voltage and a tracking command voltage, the focus command voltage being applied to a focus actuator for moving the objective lens substantially perpendicularly to a surface of the hologram recording medium, and the tracking command voltage being applied to a tracking actuator for moving the objective lens substantially horizontally to the surface of the hologram recording medium.

8. An optical unit, comprising:
a laser light source emitting laser light;
a spatial light modulator generating signal light and reference light from the laser light emitted from the laser light source, the signal light and the reference light traveling in a common light path;
a first relay lens system including a first shielding plate at a focal position thereof and transmitting the signal light and the reference light generated by the spatial light modulator, the first shielding plate having a pinhole whose size is 1 to 2 times a Nyquist size;

a phase modulating element disposed at a conjugate plane of the signal light and the reference light that have passed through the first relay lens system;
an objective lens converging the signal light and the reference light that have passed through the phase modulating element on a hologram recording medium; and
a light receiving system disposed between the phase modulating element and the objective lens for receiving light returning from the hologram recording medium.

* * * * *